(No Model.)
J. A TRAUT & C. BODMER.
MACHINE FOR GRADUATING GLASSES OR TUBES.
No. 562,678. Patented June 23, 1896.
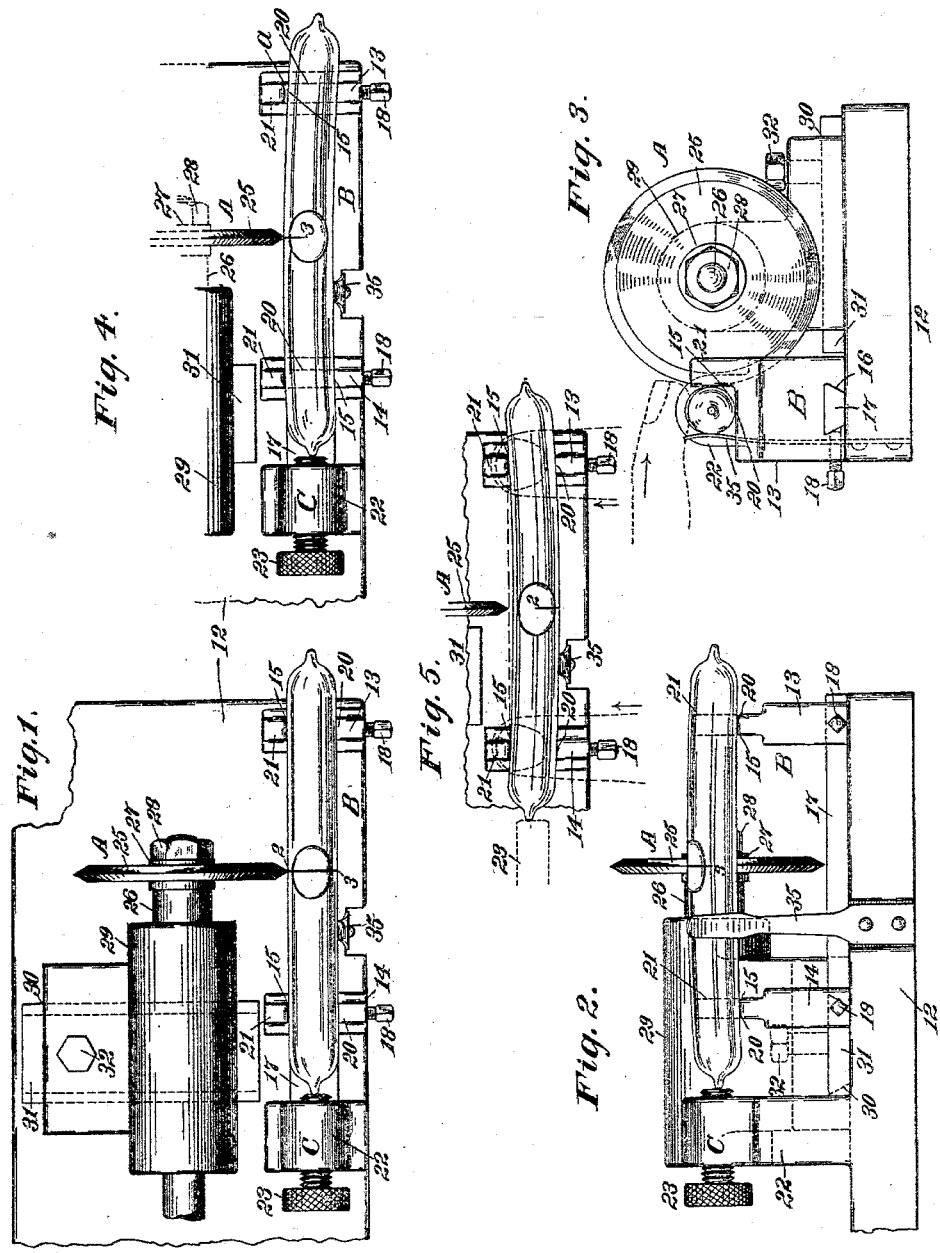
Witnesses:
Chas. D. King.
Fred. J. Dole.
Inventors:
Justus A. Traut,
Christian Bodmer:
By their Attorney
F. H. Richards.

UNITED STATES PATENT OFFICE.

JUSTUS A. TRAUT AND CHRISTIAN BODMER, OF NEW BRITAIN, CONNECTICUT.

MACHINE FOR GRADUATING GLASSES OR TUBES.

SPECIFICATION forming part of Letters Patent No. 562,678, dated June 23, 1896

Application filed January 13, 1896. Serial No. 575,221. (No model.)

*To all whom it may concern:*

Be it known that we, JUSTUS A. TRAUT and CHRISTIAN BODMER, citizens of the United States, residing at New Britain, in the county of Hartford and State of Connecticut, have invented certain new and useful Improvements in Machines for Graduating Glasses or Tubes, of which the following is a specification.

This invention relates to machines or apparatuses for marking or graduating glasses or tubes, such as level glasses or tubes; and the object of the invention is to provide a simple and effective machine or apparatus, whereby the required graduation or indicating mark or marks for indicating the position of the bubble can be properly and accurately made upon the glass or tube without the necessity of first surveying the same in order to find the proper circumferential position for the mark in the manner heretofore required.

A further object of the invention is to provide a suitable machine or apparatus, whereby glasses or tubes of various sizes and kinds can be automatically and accurately marked with any desired depth of mark; and whereby they will be so marked that, on an inspection of the same, incorrectly formed or shaped glasses can be easily and quickly distinguished, and the various grades readily separated from each other, in a manner hereinafter set forth.

In the drawings accompanying and forming part of this specification, Figure 1 is a top view of one form of machine or apparatus for marking level-glasses, a portion thereof being broken away. Fig. 2 is a front view of the machine or apparatus. Fig. 3 is a right-hand end view thereof. Fig. 4 is a top view of a portion of the machine or apparatus, showing the glass in a different position from the position shown in Fig. 1; and Fig. 5 is likewise a view similar to Fig. 4, showing the glass in a different position from that shown in Figs. 1 and 4.

Similar characters designate like parts in all the figures of the drawings.

According to the method of marking level glasses or tubes, as heretofore practiced, the glasses are first surveyed by the operator, to find the highest point thereof, which step is necessary, owing to the fact that the glass tubes are not only oftentimes of different and varying proportions and degrees of precision, but, as ordinarily used in levels, are longitudinally curved, owing to the impossibility of obtaining perfectly-formed glasses, and when the highest point is obtained by such survey the glass is usually marked by a file to indicate such point, and is then held by the operator in position to have the marking-tool place a graduating or indicating mark thereon. This manner of first finding the highest point, then indicating the same, and then marking the tube, not only requires considerable time and labor, and is, therefore, expensive, but depends solely upon the expertness and skill of the operator to place the mark thereon so that the center of the circumferential length thereof will be exactly at the highest point of the tube; and it also depends upon the eye of the operator to determine the exact length of the mark in each instance, and the exact points at which the ends of the mark are to stop on opposite sides of the tube; and—as in the same sizes of tubes the lengths of the mark may vary, owing to the operator making the mark on one tube longer than the mark on another tube, and also by extending one end of the mark at one side of a tube slightly farther around than the other end thereof at the opposite side of the tube—it has been necessary, after such tubes have been marked, to again closely examine the same, in order to separate one size and grade of glass from another size and grade; and all of which operations, as before stated, depending for accuracy upon the uncertain expertness and skill of the operator.

In order, therefore, to obviate these serious disadvantages in the marking of level-glasses or similar tubes, we have provided an improved machine or apparatus by means of which the highest point of the glass will be automatically found and marked simultaneously with its indicating or graduating mark or line, and by means of which the mark or line will always be of exactly the same circumferential length on the same sizes of tubes; whereby, on an inspection of the tubes, after they are marked, the various sizes of tubes can be quickly and easily separated by observing the various lengths of marks and the imperfect tubes removed; and this machine or apparatus comprises in a general way suitable marking means (designated generally by A) and suitable means (designated in a general way by B) for supporting and holding the level tube or glass in position to be marked, and suitable means (designated in a general way by C) for adjusting the longitudinal position of the tube.

In the preferred form thereof herein shown and described, this machine or apparatus comprises a suitable base or bed 12, for carrying the marking means A, the supporting and holding means B, and the adjusting means C. The supporting and holding means B, in the preferred form thereof, consists of a carrier comprising a pair of rests or holders in the nature of blocks 13 and 14, having suitably shaped or recessed upper ends 15, forming seats 20, and upright extensions or guides 21, whereby the level-glass can be circumferentially held in position to be marked. These rests or holders 13 and 14 are preferably adjustable toward and from each other in any suitable way, to permit the marking of various lengths of level or other glasses; but, in the preferred form of structure shown, they are adjustable by means of suitable dovetailed recesses 16, adjacent to their lower ends, whereby they are adapted to slide on a dovetailed way 17, fixedly secured to the base or bed 12 of the machine; suitable fastening devices—such as set-screws 18—extending through threaded openings in the rests, and engaging one of the walls or faces of the dovetailed way 17.

The means C, for holding the level glass or tube against longitudinal movement in one direction, and also for adjusting such longitudinal position of the tube, preferably consists of a suitable stop device, which is also in the nature of an adjusting device, secured in position to operatively engage the glass or tube when in position to be marked; and, in the preferred form shown, it comprises a suitable upright member or support 22, having a threaded and bored opening extending therethrough in alinement with the longitudinal plane of a level-glass when in position to be marked. Adjustable in this threaded bore of the member or support 22 is a suitable adjusting-screw 23, having its inner end in position to engage one end of a level-glass; and, for this purpose, the inner end of said screw may have an opening therein, or be shaped to conform to the contour of the end of the glass, or may be provided with any other suitable means for engaging the end of the glass.

The marking device may comprise any suitable means adapted for this purpose; but in the preferred form thereof herein shown the marking means A comprises a suitable member—preferably a rotatable member—in the nature of a disk 25 of any suitable material and of any desired thickness and diameter. We have found, however, in practice that the best results are obtained by the use of a disk composed of soft iron—preferably cast-iron—of about three-thirteenths to three-seventeenths of an inch in thickness. We do not, however, limit ourselves to the use of any particular material or to one necessarily having an integral structure, as it is obvious that it may be provided with inserted bits of pieces of any suitable substance adapted to mark, graduate, or line glass, porcelain, or analogous material.

The disk 25 is clamped in position on a spindle or shaft 26 by means of a collar 27 and a clamping-nut 28, turned on a threaded end of the shaft. The spindle or shaft 26 is journaled for rotation in a bearing or head 29, adjustably secured to the bed or base 12, whereby the disk can be adjusted to and from the level-glass to thereby permit the setting of the machine for marking different sizes and kinds of level or other glasses, which, as before stated, are of varying proportions and curvatures. In the form shown the bearing or head 29 is provided at its under side with a dovetailed recess 30, whereby it is adapted to slide on a dovetailed way 31, fixedly secured to the base or bed 12 of the machine, and is also provided with any suitable means, whereby the same can be adjusted and secured in its adjusted position, and which means, in practice, preferably consists of an adjusting-screw 32.

Any suitable means (not shown) for rotating the shaft or spindle, and thereby the disk 26, may be used.

It will be understood that instead of making the marking device adjustable to and from the level-glass or carrier, the supporting and holding means B can be made adjustable in any suitable way—for instance, by having the way 17 adjustable laterally on a guideway or guideways to and from the marking device, or both the marking device and the supporting and holding means can be made adjustable toward and from each other.

As one means for holding the level-glass with a relatively light pressure in position to be operated on by the marking device, a suitable spring 35 is provided, which is preferably secured to the base of the machine, and has its upper end in position to lightly and yieldingly press the glass against the marking device. This spring is preferably secured in position nearer to one of the rests or holders—for instance, the rest or holder 14—than to the other rest or holder, and is preferably disposed between the disk 25 and said rest 14, so as to press one end of the level-glass more firmly against one rest than against the other rest, whereby, when the highest side or point of the glass is turned toward the marking device, it can be pressed back by the action of the marking device—as illustrated, for instance, at *a* at the right-hand end of Fig. 4—and thus regulate the depth of the mark. It will be understood, however, that, if desired, this spring may be entirely dispensed with, and the glass pressed toward the marking device by the operator.

In the operation of this machine or apparatus for marking level glasses or tubes, the operator places a glass or tube in position on the rests or holders 13 and 14, and by placing one finger of each hand over the ends of the glass above the supporting-rests, as indicated in Fig. 5, the glass is rolled over on its support, thereby bringing the glass to its successive positions, as indicated in Figs. 5, 1, and 4, in which it will be seen that in Fig. 5 the concaved portion of the glass is adjacent to the marking device, and is, therefore, not in position to be marked; whereas in Fig. 1 the glass has been rolled into position to bring the first part of the convex portion thereof into position to permit the marking device to commence its work on the first high point of the same, while in Fig. 4 the glass has been rolled into position to bring the highest point thereof in place to be marked, and, on the continued movement of the glass, it will again be brought to its starting-point, (shown in Fig. 4,) so that the result of this rolling of the glass on its rests is to bring only the high points of the glass against the marking-disk, which has been adjusted in position for marking the same, and to mark on the glass a line, as 2 3, which line covers, circumferentially, the highest convex side of the glass, and terminates at equal distances on both sides of the highest point, so that by such rolling action the glass is automatically and accurately surveyed and marked without the necessity of a previous survey by the eye of the operator, as heretofore, and whereby such line will be in proper position to indicate how the glass should be set and placed in the level for use, as the level-maker, by observing the position of the ends of the circumferential mark or line 2 3, is thereby enabled to accurately locate the glass in the level-stock by turning the same to bring the transverse curvature of the glass in the proper vertical plane of the instrument, and whereby, also, the operator, by observing the difference in the lengths of the marks or lines, is enabled to distinguish the incorrectly-formed glasses, as well as the different sizes and grades of glasses, and hence quickly and easily separate one size and grade from another.

While this machine or apparatus has been described and illustrated as adapted to mark or graduate level-glasses, it will be understood that it is also adapted for marking the graduations on barometric and thermometric tubes or glasses, which can be readily done, for instance, by making the marking device longitudinally adjustable, or by making the carrier longitudinally adjustable, or by simply moving the tube itself longitudinally, and is also adapted for analogous work by simply changing the construction of the carrier to support different shapes of articles, which, it is obvious, can be easily and quickly done without departing from the scope of this invention.

Having described our invention, we claim—

1. In a machine of the class specified, the combination with individual level-glass holders independently adjustable toward and from each other and adapted to support a level-glass or other article circumferentially in position to be marked; a yielding device intermediate said holders for transversely engaging the periphery of said glass or article; and a marking device.

2. The combination with means for supporting a level-glass or other article in position to be marked; of means engaging the periphery of said level-glass or article to press and yieldingly hold the same in said position with greater pressure at one part of said level-glass or article than at the other part thereof.

3. In a machine of the class specified, the combination with means for circumferentially supporting a level-glass or other article intermediate of its ends in position to be marked; an upright device disposed between the supporting means and transversely engaging the periphery of said glass or article and serving to press and yieldingly hold the same in position; and means for marking said level-glass or article.

4. The combination with means for supporting a level-glass or other article in position to be marked; of means engaging the periphery of said level-glass or article to press and yieldingly hold the same in said position; and adjustable means for adjusting and regulating the longitudinal position of said level-glass or article.

5. The combination of means adjustable longitudinally of a level-glass or other article for supporting said level-glass or article in position to be marked; means adjustable laterally of the level-glass or article for marking the same; means engaging the periphery of said level-glass or article to press and yieldingly hold the same in position relatively to the marking means; and adjustable means for adjusting and regulating the longitudinal position of said level-glass or article independently of the adjustment of the level-glass-supporting means.

6. A holding and supporting means for a level-glass or other article, comprising rests or holders adjustable toward and away from each other to support different lengths of level-glasses or articles, each of said rests or holders having a seat and an upright extension or guide adjacent to said seat for circumferentially supporting said level-glass or article, a spring located between said holders; and a suitable marking-tool.

7. A holding and supporting means for a level-glass or other article, comprising rests or holders adjustable toward and away from each other to support different lengths of level-glasses or articles; and a spring secured in position to engage the level-glass or article and press the same with greater pressure relatively to one of said rests than to the other rest.

8. The combination of level-glass holding and supporting means comprising rests or holders adjustable toward and away from each other for supporting different lengths of level-glasses or other articles; a spring secured in position to engage the level-glass or article, whereby the same will be yieldingly held in position and the depth of the mark thereby regulated; and a soft-iron disk for marking the level-glass or article.

9. In a machine of the class specified, the combination of holding and supporting means comprising rests or holders adjustable toward and from each other, for supporting a level-glass or other article to be marked; a spring secured in position to engage the level-glass or article, and press the same with greater pressure relatively to one rest than to the other rest, whereby the same will be yieldingly held in position, and the depth of the mark thereby regulated; and means, also supported in position to regulate and adjust the longitudinal position of the level-glass or article.

10. In a machine of the class specified, the combination of holding and supporting means comprising rests or holders adjustable toward and from each other, for supporting a level-glass or other article to be marked; a spring secured in position to engage the level-glass or article, and press the same with greater pressure relatively to one rest than to the other rest, whereby the same will be yieldingly held in position, and the depth of the mark thereby regulated; and a marking device adjustable toward and from said rests for marking the level-glass or article.

11. In a machine of the class specified, the combination of a base; supporting and holding means carried thereon for circumferentially carrying a level-glass or other article, and comprising a pair of rests or holders adjustable toward and from each other; a bearing or head adjustably supported on the base, and adjustable toward and from the supporting and holding means, and adapted to support a rotatable shaft carrying a marking device; and a spring secured in position to engage the level-glass or article at a point intermediate of the marking-disk and one of the rests, to thereby press said glass or article with a relatively light pressure toward the marking device, and whereby said glass or article will be held with greater pressure relatively to one of the rests or holders than to the other rest or holder.

12. In a machine of the class specified, the combination of a base, supporting and holding means carried thereon for circumferentially supporting a level-glass or other article, and comprising a pair of rests or holders adjustable toward and from each other; fastening means for securing said rests in adjusted position; a bearing or head adjustably supported on the base and adjustable toward and from the supporting and holding means, and adapted to support a rotatable shaft carrying a marking device; fastening means for securing the bearing or head in adjusted position; a spring secured in position to engage the level-glass or article at a point intermediate of the marking device and one of the rests, to thereby press said glass or article with a relatively light pressure toward the marking device, and whereby said glass or article will be held with greater pressure relatively to one of the rests or holders than to the other rest or holder; and an adjusting device supported in position for regulating and adjusting the longitudinal position of the level-glass or article.

JUSTUS A. TRAUT.
CHRISTIAN BODMER.

Witnesses:
R. A. MOORE, Jr.,
W. H. PIMM.